April 3, 1928.
A. LIPNER
CULINARY STRAINER
Filed April 21, 1927
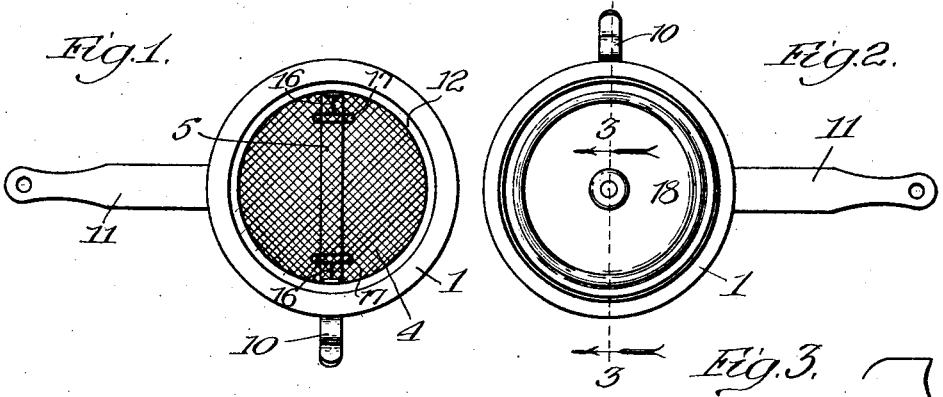
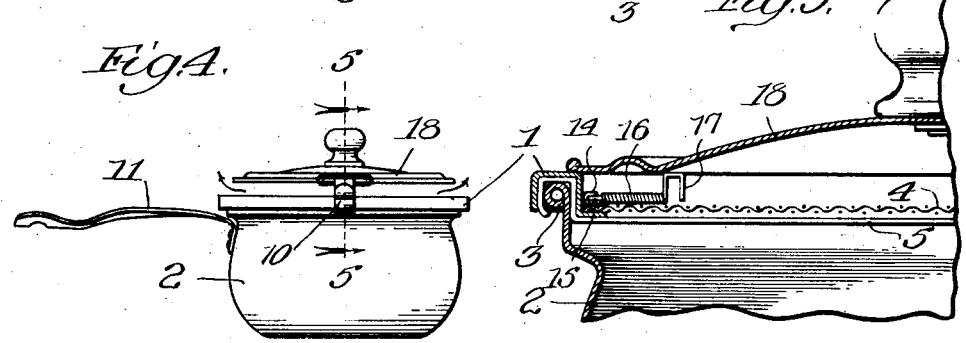
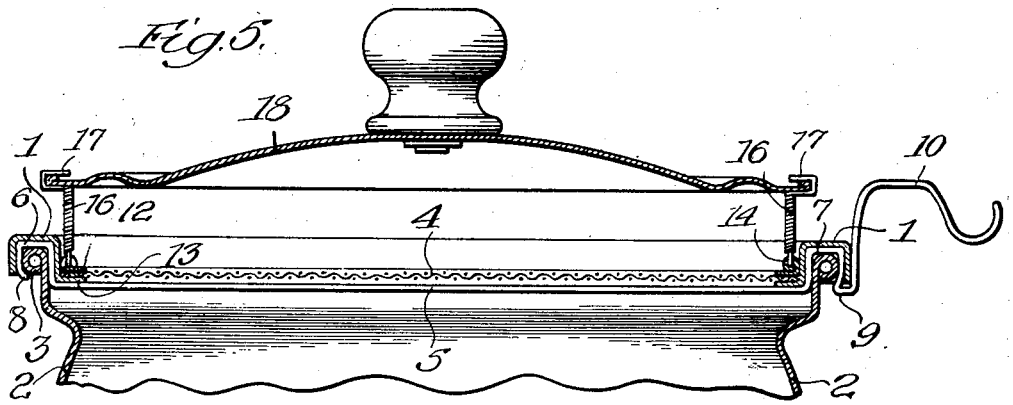
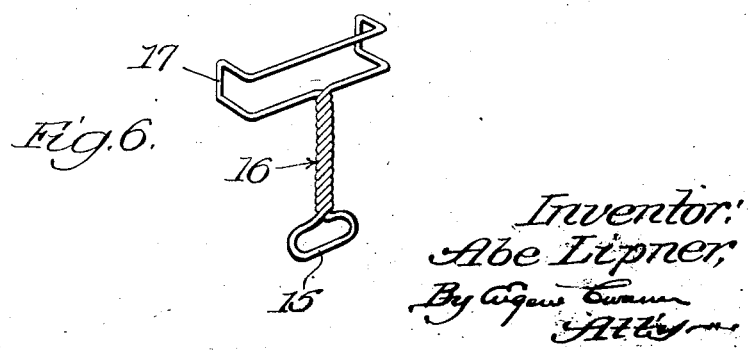
Inventor:
Abe Lipner, Patented Apr. 3, 1928.

1,664,564

UNITED STATES PATENT OFFICE.

ABE LIPNER, OF INDIANA HARBOR, INDIANA.

CULINARY STRAINER.

Application filed April 21, 1927. Serial No. 185,402.

This invention relates to a strainer for cooking utensils, such as pots, kettles, saucepans, and the like.

One object of my invention is to provide a strainer which fits over the entire top portion of the vessel and has its perforations or apertures distributed all over the top of the vessel so that the latter may be drained at any place about the edge of the vessel, and thus not confined to one place as when the strainer openings are restricted to one location in the cover.

Another object of my invention is to have the connection between the strainer and the vessel detachable so that the strainer may be readily removed whenever desired, yet when on the vessel is so tightly connected therewith that the strainer will not drop off when the vessel is inverted for complete draining.

A further object of my invention is to provide the strainer with means to support the lid of the vessel slightly above the top of the same when the strainer is on the vessel and thus close the vessel to the escape of heat and steam except around the edges of the lid and in that way conserve the heat within the vessel and save fuel, while at the same time have the vessel sufficiently open or uncovered to prevent boiling over.

A further object of my invention is to have the lid supports pivotally connected with the strainer so that the supports may be swung down and out of the way so that the lid may be placed directly against the strainer to completely close the vessel.

The invention consists further in the matters hereinafter described and claimed.

In the accompanying drawings—

Fig. 1 is a top plan view of a cooking vessel having the strainer of my invention applied thereto;

Fig. 2 is a similar view showing the lid or cover for the vessel placed over the strainer;

Fig. 3 is an enlarged fragmentary vertical sectional view taken on line 3—3 of Fig. 2;

Fig. 4 is a side elevational view on the scale of Figs. 1 and 2, showing the lid supported above the strainer by the lid supports carried by the latter;

Fig. 5 is an enlarged fragmentary vertical sectional view taken on line 5—5 of Fig. 4; and Fig. 6 is a perspective view of one of the lid supports.

The strainer of my invention comprises a sheet metal ring 1 made channel shape and of a diameter to fit over the upper edge of a cooking pot or vessel 2 with the beaded upper edge 3 of said vessel in the channel of the ring, as shown in Figs. 3 and 5. The ring 1 carries a screen 4, which extends over the opening in the ring and which screen when the ring is on the upper edge of the vessel completely covers it. Thus the screen 4 serves as a guard to prevent anything dropping into or being placed in the vessel while the screen covers the same whether the vessel is in use on a cook-stove or set aside for its contents to cool or for later use.

Extending diametrically across the ring 1 on the under side of the screen 4 is a flat metal bar 5 having bent up portions 6, 7 fitting in the channel of the ring on opposite sides thereof and soldered or otherwise rigidly secured thereto for fastening the bar to the ring. These bent up portions 6, 7 conform to the channel in the ring 1 and fit therewith over the bead 3 at the upper edge of the vessel 2. The outer parts of these channel portions 6, 7 are bent slightly inward, as at 8 and 9, respectively, to hook under the bead 3 of the vessel for holding the ring thereon.

The bar 5 continues beyond the ring 1 from te bent up portion 7 thereof into a handle 10, which is outside the vessel so that the ring with its screen 4 may be readily lifted off and be placed back on the same. In doing the latter, the hooked end 8 of the bar 5 is first engaged under the bead 3 at one side of the same and the ring 1 swung down on the vessel about said hooked end 8 as a pivot until the opposite part 9 of the bar 5 snaps over the bead 3 and locks the ring on the same. A slight clearance is provided between the part 9 and the ring 1 so that the former may yield when snapping on and off the bead.

The screen 4 also serves as a strainer when the vessel 2 with the ring 1 thereon is tilted into a position to drain the same. The bar 5, at this time, serves to support the solid contents in the vessel and thus relieve the screen of undue strain, even when the vessel is inverted when completely draining it. With the screen 4 extending entirely over the top of the vessel 2, the latter may be drained at any place around the edge whether near or opposite to the handle 11 with which the vessel may be provided. Thus, draining the vessel is not limited to any particular location about the edge of the same, and moreover the vessel when heated may be easily and quickly drained without steaming the hand or hands of the operator, as it is not necessary to hold a lid partially over the vessel as heretofore to keep the solid contents from falling out, as the screen 4 accomplishes that purpose.

The screen 4 may be secured to the ring 1 in any suitable way. In the drawings I have shown a form of fasten wherein the margin of the screen is clamped between a flange 12 about the inside of the ring and a flange 13 on the latter. The screen may be riveted to these flanges by riveting the same together through the screen, or the parts may be soldered.

The upper flange 12 is provided with struck up eyes 14, 14 on opposite sides of the same, and these eyes accommodate loops 15 at the lower ends of lid supports 16. These supports are preferably made of wire and are provided at their upper ends with elongated loop sections 17, 17, which open inwardly and provide channels to receive the outer edge of a lid 18 provided for the vessel 2. When the supports 16, 16 are swung down into inoperative positions against the screen 4, the lid 18 may be placed on the top of the ring 1 to close the vessel, as shown in Fig. 3. When the supports are raised, the lid 18 is supported over the top of the vessel but sufficiently above the same to allow for the escape of steam and hot gases when the vessel is over a fire. Thus, while the lid serves to confine the heat and save fuel, the outlet about the raised edge of the lid will allow steam to escape and thus prevent the vessel boiling over.

The details of structure shown and described may be variously changed and modified without departing from the spirit and scope of my invention.

I claim as my invention:

1. A strainer of the character described, consisting of a sheet metal ring made channel shape to receive and fit over the upper edge of a cooking vessel and extend completely about the same, a screen carried by the ring and extending completely over the opening within the same, and means within the channel of the ring and carried thereby for releasably connecting the same to the upper edge of the vessel on applying the ring thereto.

2. A strainer of the character described, consisting of a sheet metal ring made channel shape to receive and fit over the upper edge of a cooking vessel and completely surround the same, a screen carried by the ring and extending completely over the opening within the same, means within the channel of the ring and carried thereby for releasably securing it to the upper edge of the vessel, and a bar secured to the ring and extending across the screen for strengthening it on applying the ring thereto.

3. A strainer of the character described, consisting of a sheet metal ring made channel shape to fit over the upper edge of a cooking vessel and completely surrounding the same, a screen secured to the ring and completely covering the opening within the same, a bar secured to the ring and extending across the same for strengthening said screen, said bar having portions within the channel of the ring to releasably fasten the ring on the upper edge of the vessel.

4. A strainer of the character described, consisting of a sheet metal ring made channel shape to receive and fit over the beaded upper edge of a cooking vessel and completely surround the same, a screen secured to the ring and completely covering the opening therein, a bar secured to said ring and extending across the under side of the screen, said bar having channel shaped portions in the ring to hook under and snap over, respectively, the beaded upper edge of the vessel on applying the ring thereto, and a handle for the bar outside of said ring.

5. A strainer of the character described, consisting of a sheet metal ring made channel shape to receive and fit over the upper edge of a vessel and extend completely around the same, a screen secured to said ring and extending entirely over the opening therein, and means connected with the ring and movable from an inoperative position below the top of the ring to a position extending above the same for supporting a lid in spaced relation above the ring.

6. A strainer of the character described, consisting of a sheet metal ring made channel shape to receive and fit over the upper edge of a vessel and extend completely around the same, a screen secured to said ring and extending entirely over the opening therein, and members pivoted to the ring on the inside thereof and adapted to be swung from inoperative positions lying against the screen to positions extending above the same for supporting a lid in spaced position above the ring.

7. A strainer of the character described, consisting of a sheet metal ring made channel shape to receive and fit over the upper edge of a vessel and extend completely around the same, a screen secured to said ring and extending entirely over the opening therein, and members pivoted to the ring on the inside thereof and adapted to be swung from inoperative positions lying against the screen to positions extending above the same for supporting a lid in spaced position above the ring, said members being made of wire and having loop sections at their upper edges to receive the outer edge of the lid.

In testimony whereof I affix my signature this 18th day of April, 1927.

ABE LIPNER.